US012053430B1

(12) United States Patent
Gutierrez

(10) Patent No.: US 12,053,430 B1
(45) Date of Patent: Aug. 6, 2024

(54) ANTERIOR ROLLING WALKER

(71) Applicant: Charles Gutierrez, Bakersfield, CA (US)

(72) Inventor: Charles Gutierrez, Bakersfield, CA (US)

( * ) Notice: Subject to any disclaimer, the term of this patent is extended or adjusted under 35 U.S.C. 154(b) by 0 days.

(21) Appl. No.: 18/397,785

(22) Filed: Dec. 27, 2023

(51) Int. Cl.
*A61H 3/04* (2006.01)
*A61H 3/00* (2006.01)

(52) U.S. Cl.
CPC ............... *A61H 3/04* (2013.01); *A61H 3/008* (2013.01); *A61H 2003/006* (2013.01); *A61H 2201/0192* (2013.01); *A61H 2201/1642* (2013.01)

(58) Field of Classification Search
CPC .................................. A61H 3/04; A61H 3/008
See application file for complete search history.

(56) References Cited

U.S. PATENT DOCUMENTS 2,327,671 A * 8/1943 Rupprecht ............... A61H 3/04 482/67
2,625,202 A * 1/1953 Richardson .............. A61H 3/04 482/68
3,252,704 A * 5/1966 Wilson ................. A61G 7/1017 482/68
3,263,822 A * 8/1966 Weinman ................ B66C 23/48 212/301
5,502,851 A * 4/1996 Costello ................... A61H 3/04 5/89.1
5,569,129 A * 10/1996 Seif-Naraghi ... A63B 21/00181 482/69
5,603,677 A * 2/1997 Sollo .................... A61H 1/0229 606/241
5,662,560 A * 9/1997 Svendsen ........... A63B 71/0009 482/54
6,619,681 B2 9/2003 Gutierrez
6,899,660 B1 * 5/2005 Chin ...................... A61H 3/008 135/85
7,041,069 B2 * 5/2006 West .................... A61H 1/0237 601/5
7,275,554 B2 10/2007 Mullholand
8,151,812 B2 4/2012 Razon
9,101,520 B2 8/2015 Goldish et al.
9,566,207 B1 2/2017 Ratliff
9,649,236 B1 5/2017 Wike, Jr. et al.
9,855,175 B2 1/2018 Wike, Jr. et al.
10,842,706 B2 11/2020 Fawcett et al.

(Continued)

FOREIGN PATENT DOCUMENTS

KR 20030016902 A * 8/2001 ............... A61G 5/00
WO WO-03017894 A1 * 3/2003 ............... A61G 5/00

*Primary Examiner* — Noah Chandler Hawk
(74) *Attorney, Agent, or Firm* — James M. Duncan; Scanlon Duncan LLP

(57) ABSTRACT

An anterior rolling walker has a ground support frame, a vertical riser assembly, a torso support assembly and an actuator apparatus which allows a user to raise the torso support assembly from a first lowered position to a second raised position, and to anyone of a plurality of positions there between. The lift mechanism utilizes a single telescoping riser assembly which is positioned offset from the front of the walker, such that there is minimal structure to the front of the user, allowing the user to ambulate directly to (and make physical contact with) tables, desks, refrigerators, loved ones, and the like.

16 Claims, 13 Drawing Sheets

(56) References Cited

U.S. PATENT DOCUMENTS

| | | | | |
|---|---|---|---|---|
| 11,540,965 | B2 * | 1/2023 | Linde | A61G 7/1017 |
| 2012/0042917 | A1 | 2/2012 | Workman et al. | |
| 2017/0231855 | A1 | 8/2017 | Frazier, Jr. | |
| 2019/0321251 | A1 * | 10/2019 | Chen | A61H 3/008 |
| 2023/0320921 | A1 | 10/2023 | DiLorenzo | |

* cited by examiner

ANTERIOR ROLLING WALKER

BACKGROUND OF THE INVENTION

The present invention generally relates to rolling walkers utilized by persons requiring support as they stand or walk. The present invention more particularly relates to rolling walkers which are capable of raising and lowering a person between a seated position, a standing position, and intermediate positions there between. The present invention is further configured to provide support and stability for a person as the person stands and walks. The present invention further relates to an apparatus which may be utilized by physical therapists and medical practitioners for providing rehabilitation, preventive care, and treatment for patients having chronic conditions, illness or injuries which impact the patient's ability to stand and/or walk.

There are known physical benefits in assisting a person to a standing position where the person's own musculoskeletal structure provides at least part of the support. Such benefits include improved bowel and bladder regularity, strengthening of the cardiovascular system, reduction of edema in lower extremities, assisting the lungs in staying clear, improved digestive metabolic process, lessening of muscle spasms and contractions, stretching of tendons and ligaments in lower extremities, reducing calcium loss in bones, and improvement in balance.

Walkers often provide crucial support for mobility, exercise, and overall confidence with walking. Walkers assist a user in upright movement by providing stability, reducing lower-limb loading, and decreasing the risk of falls. By providing multiple points of contact with the ground, walkers provide a wide, stable base of support that gives patients a needed sense of safety. Walkers may be used to assist with ambulation of patients who are unable to bear weight through a limb injured due to trauma, fractures, amputations, joint replacements, or soft tissue impairments. By directing body weight through the arms and the walking apparatus, less or no force is transmitted through the affected limb. With the use of walkers, patients are often able to strengthen and rehabilitate satisfactorily without further damage to the impaired areas.

Walkers also provide psychotherapeutic benefits, such as improving mood and decreasing negative feelings. The benefits increase as the device allows the user to participate in regular day-to-day activities previously enjoyed by the user. Thus, devices which facilitate walking, such as walkers, also provide an important mental health benefit.

The two main types of walkers are anterior walkers and posterior walkers. Anterior walkers have the frame in the front, while posterior walkers have the frame in the back. With an anterior walker, the user leans forward onto the apparatus, shifting their center of gravity forward and leaning at the hips. With a posterior walker, the user leans back on the structure and the walker itself supports the center of gravity.

A specific type of walker known as a rollator combines the features of a walker and a wheelchair. A rollator typically has a lightweight frame with four wheels and handlebars and may include a padded seat. Rollators provide support and stability for persons while they are walking, but also allows the user the option to sit and rest.

As indicated above, walkers provide a vital service to persons who require support and stability for standing and walking. Walkers also provide a helpful tool to physical therapists and other medical practitioners in providing services to their patients. Some walkers provide a lifting mechanism which raises a user from a sitting to standing position.

A disadvantage of walkers with lifting mechanisms is that the devices typically have structural components which restrict the user's ability to perform activities or functions which require spatial access to either the front or rear of the walker. For devices having structural components which restrict forward reach, these devices prevent the user from being able to use the device to position the user directly adjacent to a table, desk, sink, refrigerator door, etc. Forward-facing structural components also present a barricade to anyone wishing to approach the user from the front, thereby inhibiting physical contact, such as hugs, between the user and others.

Devices which require the user to back into the device may inhibit a user from conveniently using the device as support when backing onto a chair, couch, bed, etc., while also creating a barrier for anyone, such as a therapist or loved one, to approach the user from the rear to provide assistance to the user. Many of the known devices create a sense of isolation and create a barrier between the user and everyday life activities, experiences and human interaction.

SUMMARY OF THE INVENTION

Embodiments of the presently disclosed invention provide a solution to the above-described problem by providing an anterior walker having a minimal amount of structure extending from the front of the walker and also providing ready access to the user from the back of the apparatus. This configuration allows a user to ambulate directly adjacent to a table, desk, wash basin, refrigerator, window, loved one, etc. This feature of the disclosed device is made possible by positioning an asymmetrical lift mechanism to a single side of the walker offset from the front center of the apparatus. This configuration enables a user to experience a renewed closeness to life. This feature also reduces the footprint of the walker. The lift mechanism is a single telescoping assembly which may be actuated by the user from a lowered position to any position up to a maximum height. Because of the ready access to the user from both the front and the back side of the apparatus, embodiments of the present invention facilitate use of the apparatus by physical therapists in providing therapy to patients, or by persons providing assistance to the user.

An embodiment of the anterior walker has a ground support frame having a plurality of ground engaging wheels. Embodiments of the anterior walker have an openly configured back end through which a user may enter the walker to engage and be supported by a torso support assembly.

A vertical riser assembly is attached to the ground support frame. The vertical riser assembly has an outer housing and an inner tube member slidingly contained within the outer housing, configured such that the inner tube member telescopes outwardly and inwardly with respect to the outer housing. The outer housing and inner tube member may be configured as rectangular tubing. A plurality of inward facing bearings may be mounted within an interior facing wall of the outer housing, where the inward facing bearings each have an inward facing surface which engage an outside facing surface of the inner tube member. These inward facing bearings support the inner tube as it moves with respect to the outer housing.

The torso support assembly is attached to the vertical riser assembly, where the torso support assembly is configured to support a user.

Embodiments of the anterior walker have an actuator apparatus which has a base member attached to the ground support frame. The actuator apparatus has an extension member which has a first end attached to the base member and a second end attached to the vertical riser assembly. The actuator apparatus has a prime mover which is configured to actuate the extension member and thereby move the vertical riser assembly and the attached torso support assembly between a lowered first position and a raised second position. Examples of the actuator apparatus a hydraulic or pneumatic cylinder where the prime mover may be a pump/motor or compressor/motor combination. The actuator apparatus may also include a ball screw or a rack and pinion gear combination, where the prime mover may be an electric or hydraulic motor.

The torso support assembly may have arm support members which are positioned to enable a user to be supported by the walker. The arm support members may be pivotably attached to the torso support assembly to allow a user to manipulate the arm support members to provide the desired support and comfort. The arm support members may each have an elbow support member and a hand support member. The elbow support member and hand support member may be configured such that a user may place an elbow in the elbow support member and reach forward and grasp the hand support member. The arm support members may be configured such that a user is able place the user's arms such that the forearm is in an approximately parallel position with the ground, allowing the user to fully support the user's body with the arm support members.

Embodiments of the invention may also comprise support structures which allow a person having little to no upper body strength to be supported in standing and walking with embodiments of the invention. For example, an embodiment of the invention may utilize thigh supports which depend from the torso support assembly.

DETAILED DESCRIPTION OF THE EMBODIMENTS OF THE INVENTION

Figure 1:
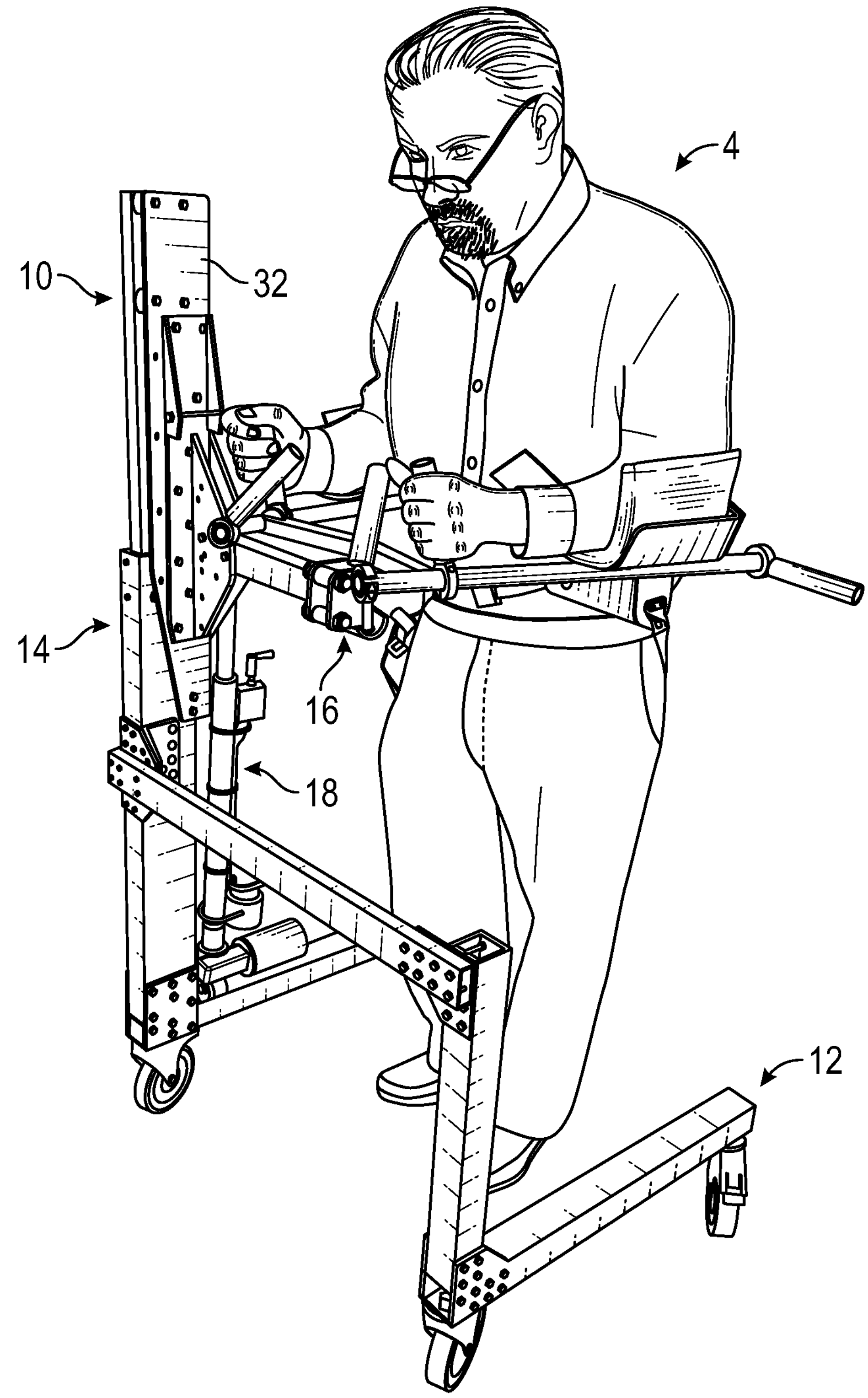
FIG. 1 shows a front oblique perspective view of an embodiment of the present invention supporting a user.
Figure 2:
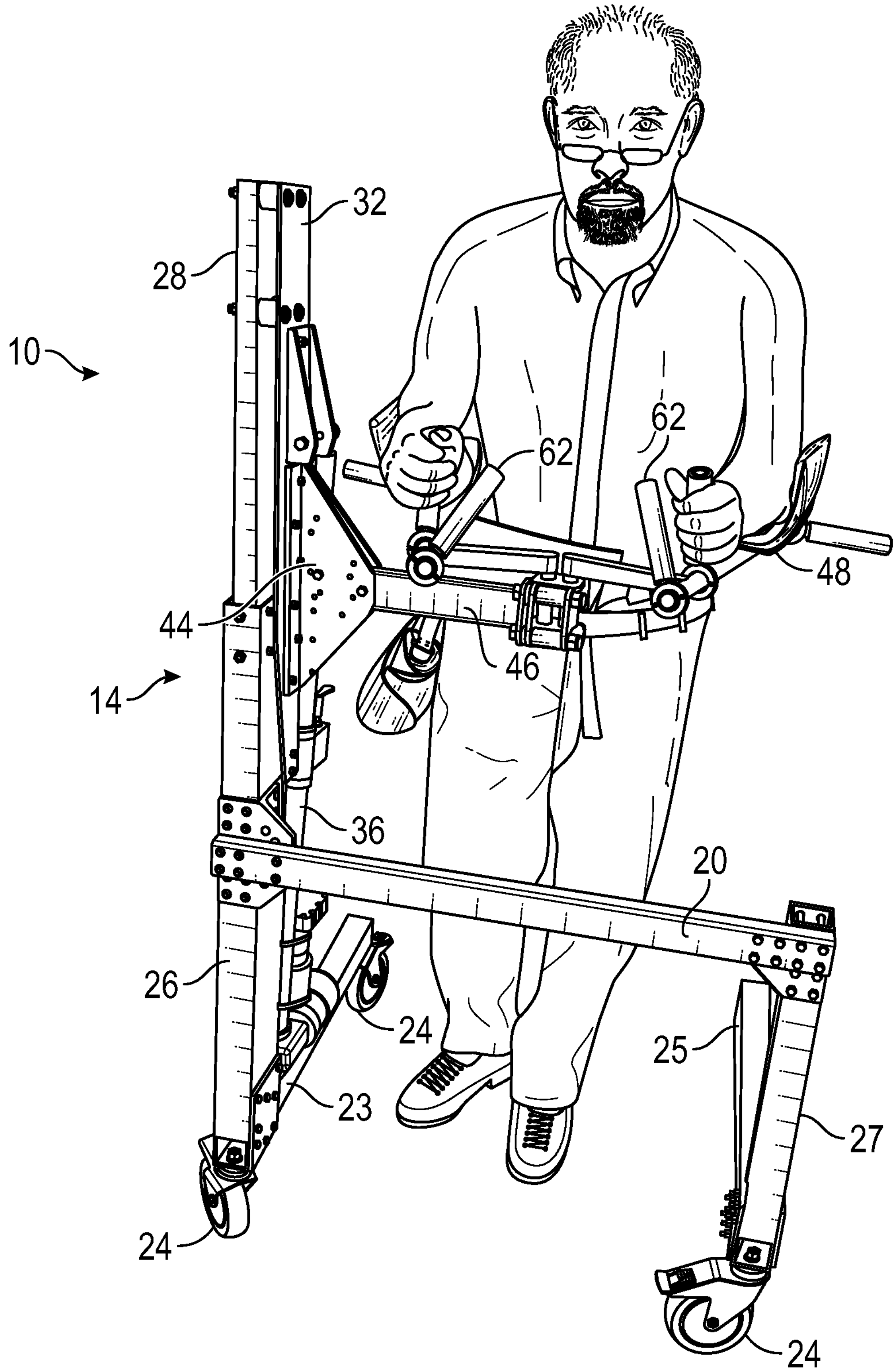
FIG. 2 shows a front perspective view of an embodiment of the present invention supporting a user.
Figure 3:
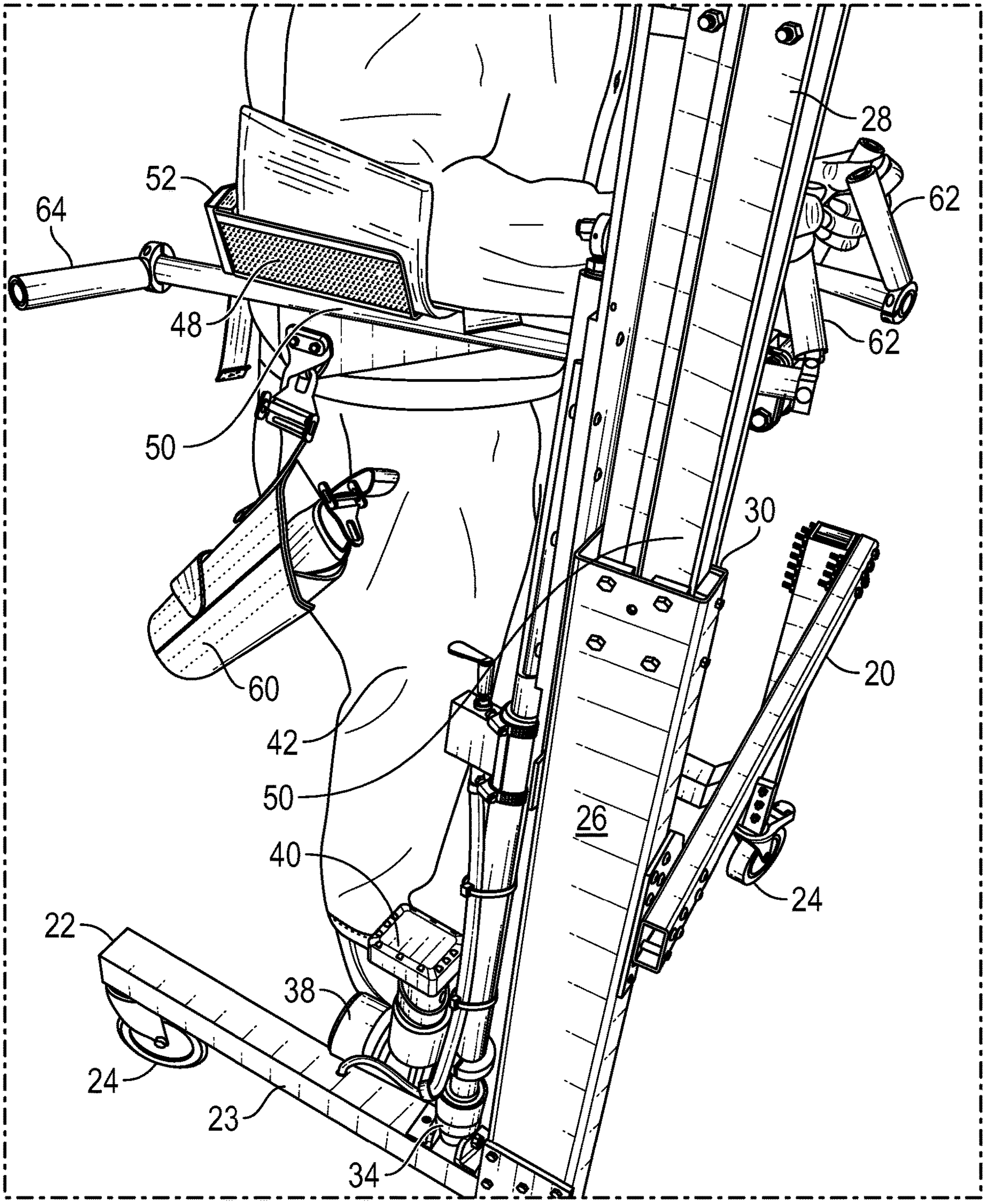
FIG. 3 shows a partial side view of an embodiment of the present invention.
Figure 4:
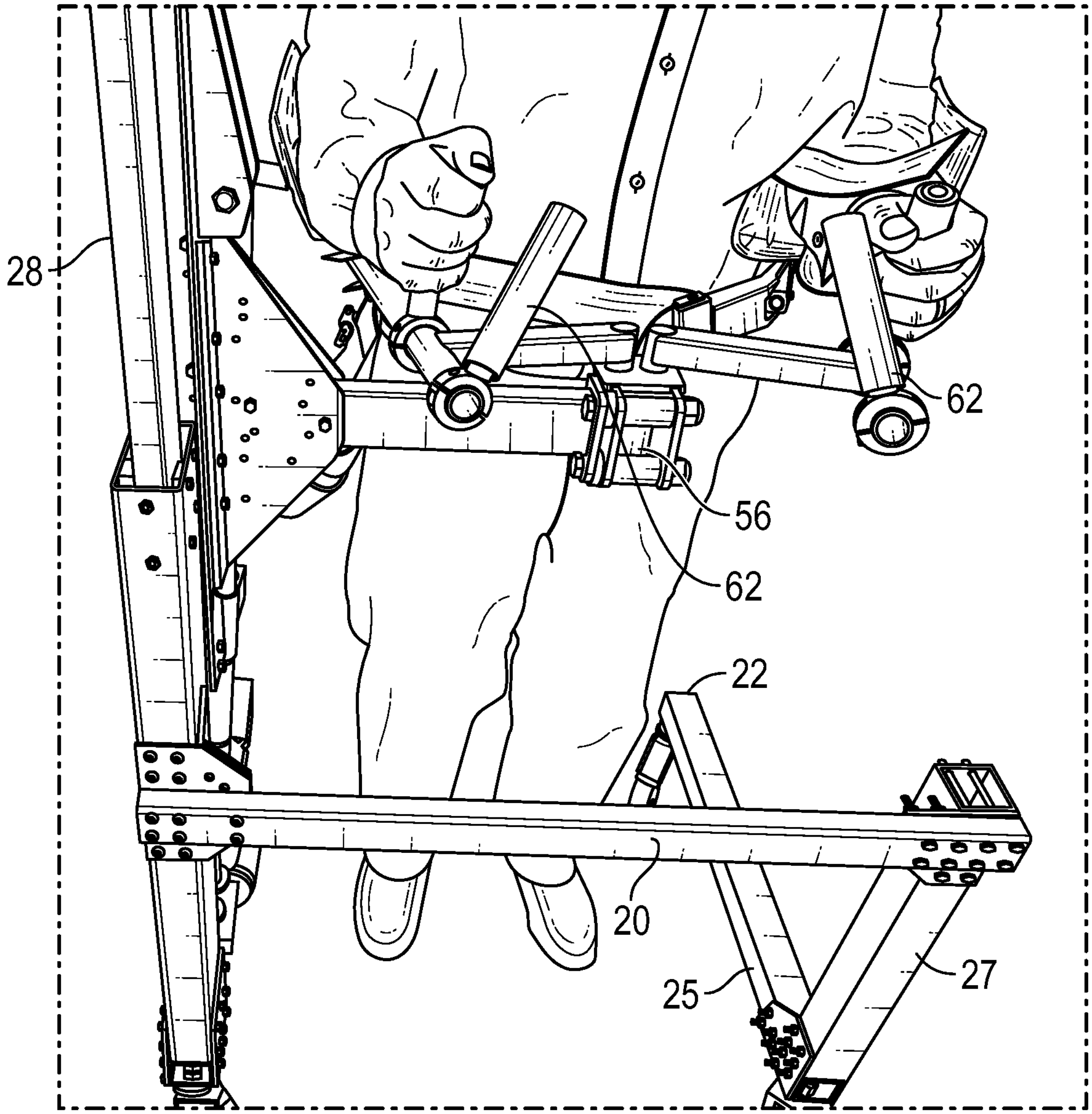
FIG. 4 shows a first close-up front view of an embodiment of the torso support assembly of the present invention.
Figure 5:
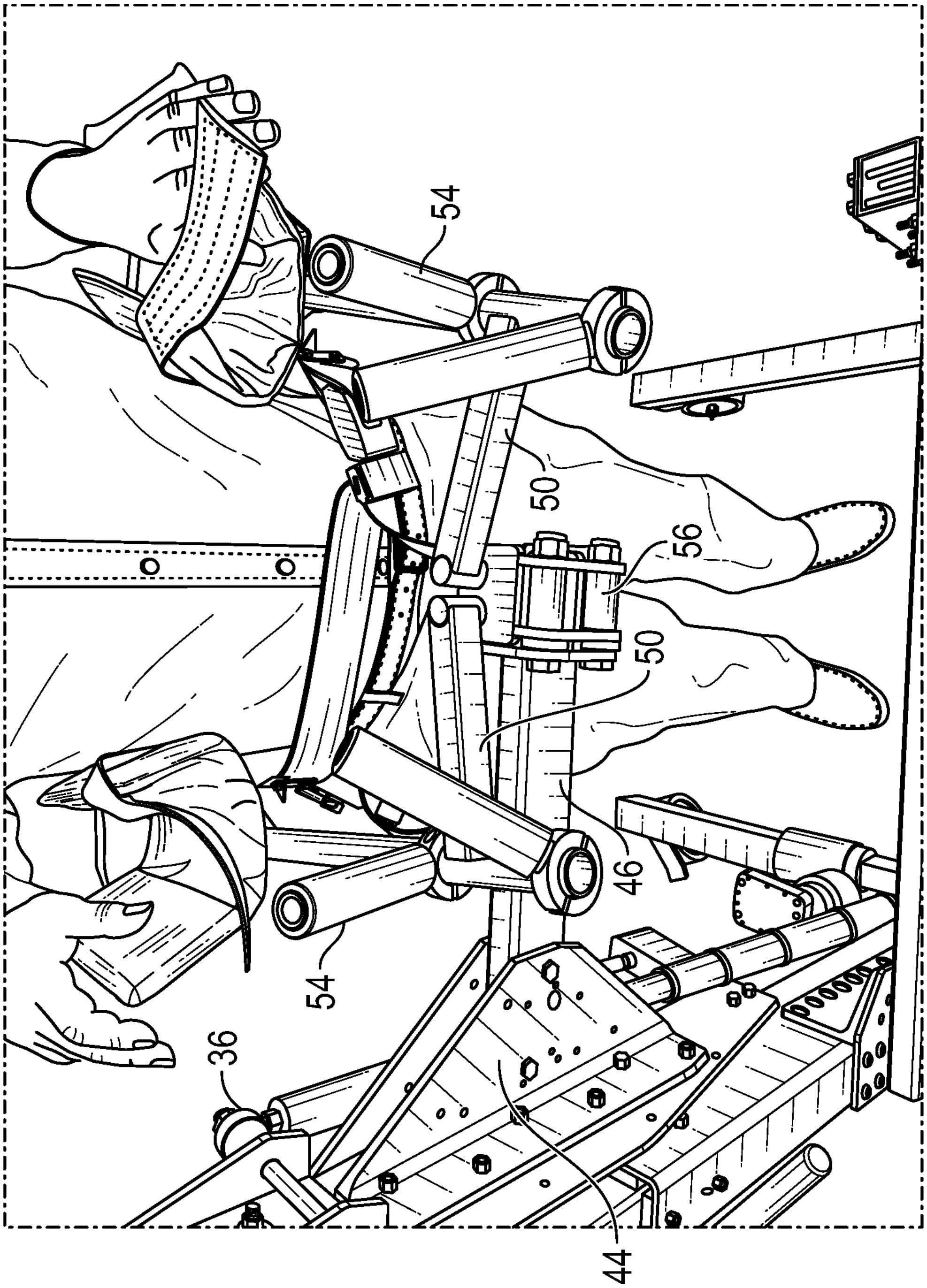
FIG. 5 shows a second close-up front view of an embodiment of the torso support assembly of the present invention.
Figure 6:
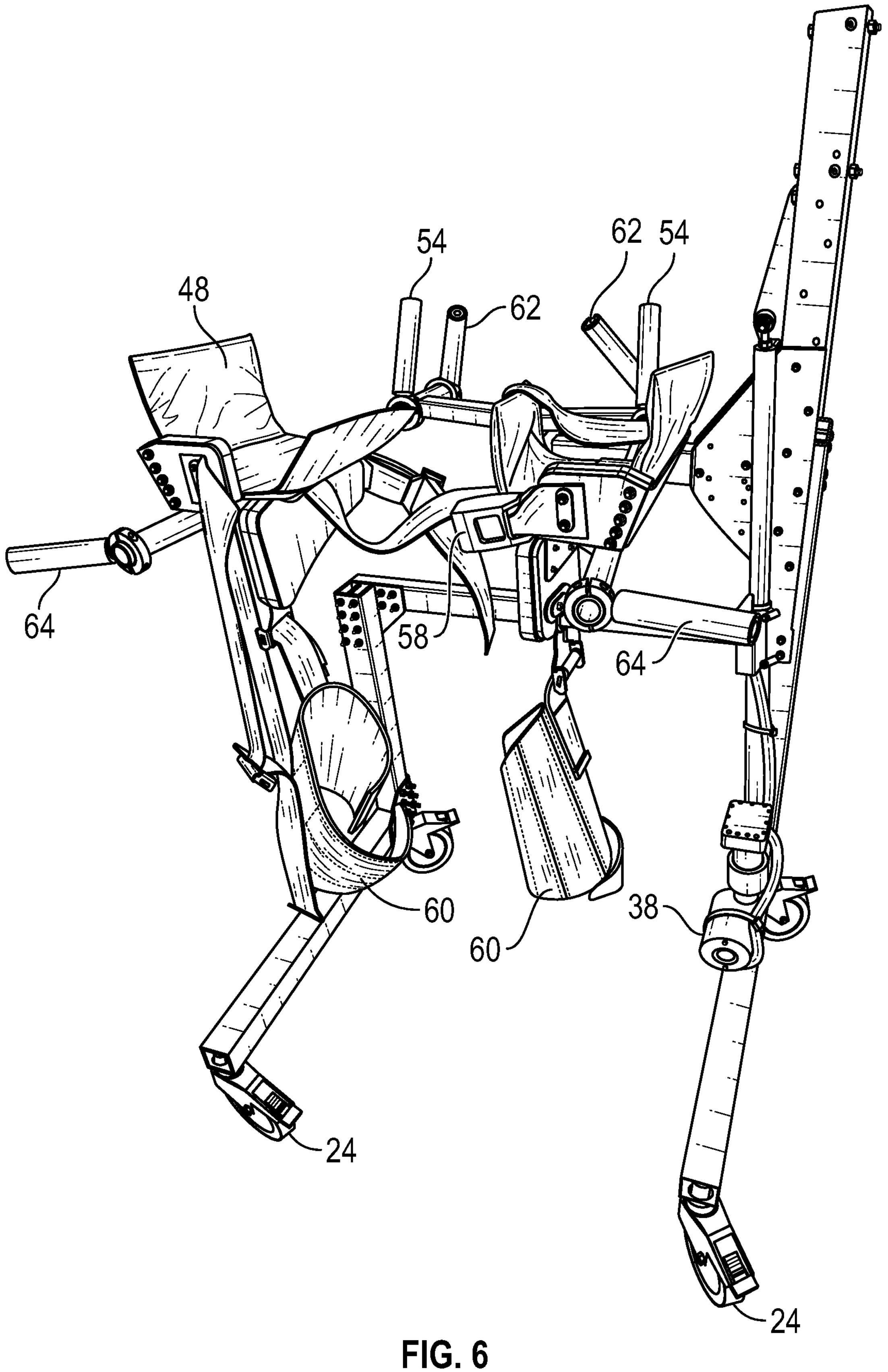
FIG. 6 shows a rear perspective view of an embodiment of the present invention.
Figure 7:
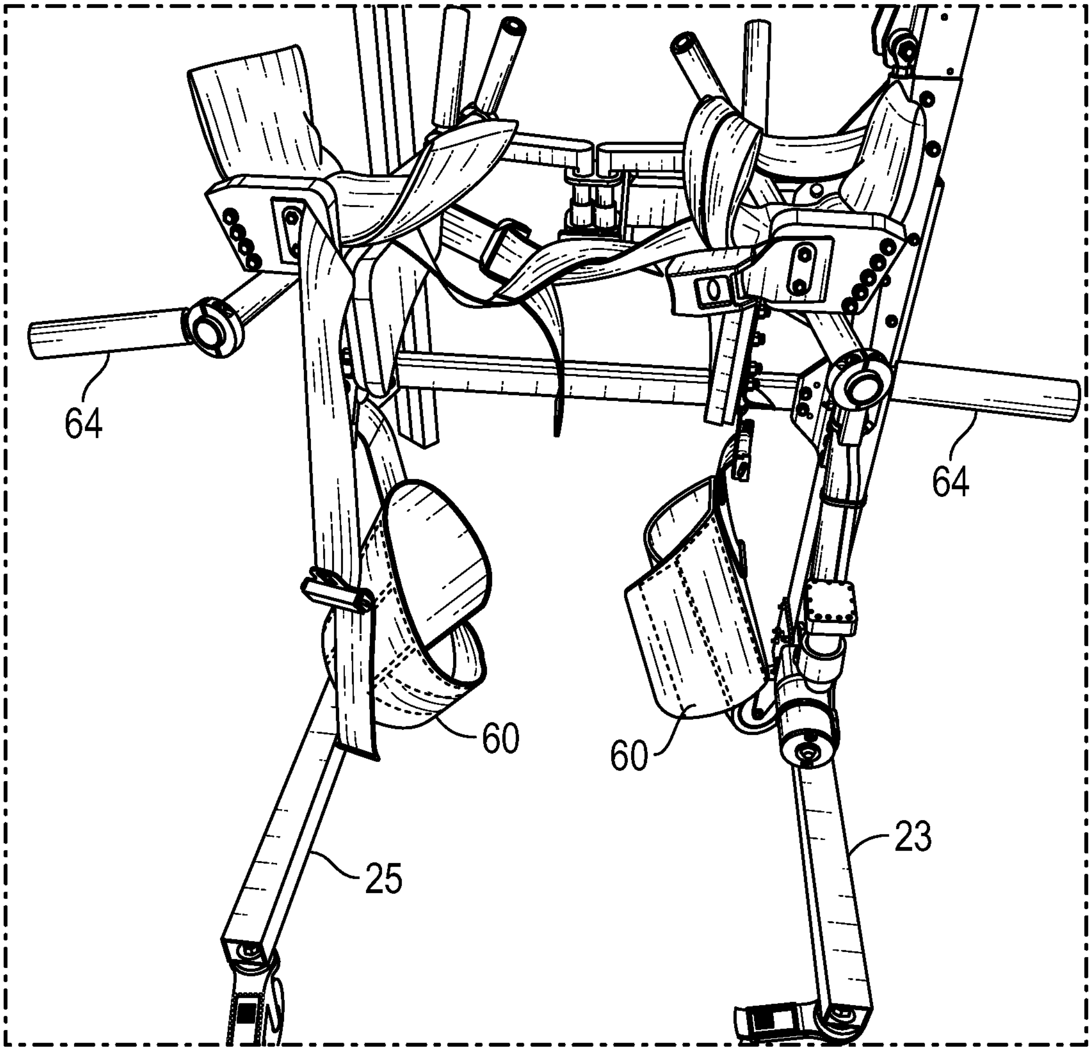
FIG. 7 shows a second rear view of an embodiment of the present invention.
Figure 8:
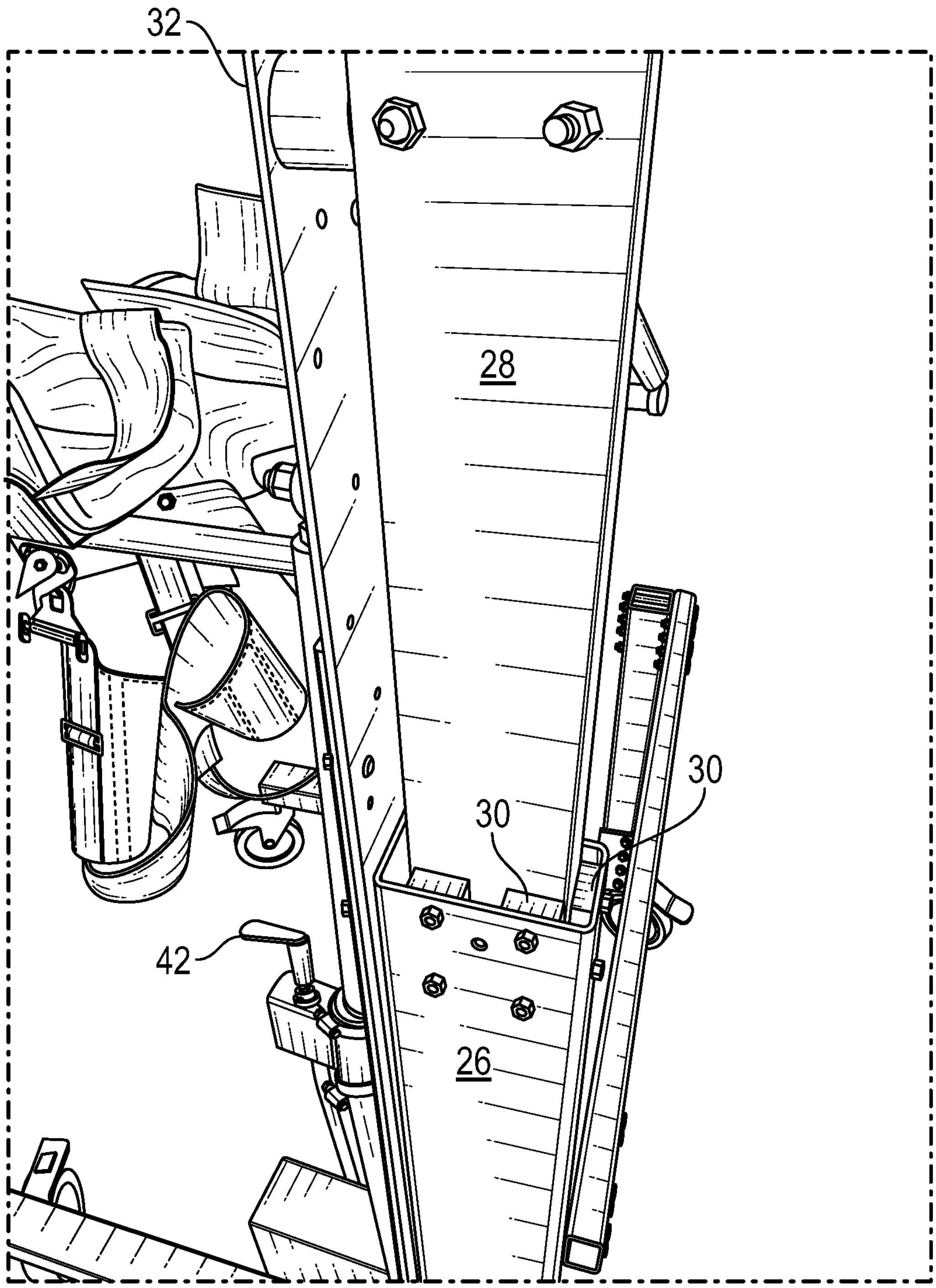
FIG. 8 shows a close-up view of the vertical riser assembly showing the inner tube member in a raised position with respect to the outer housing.
Figure 9:
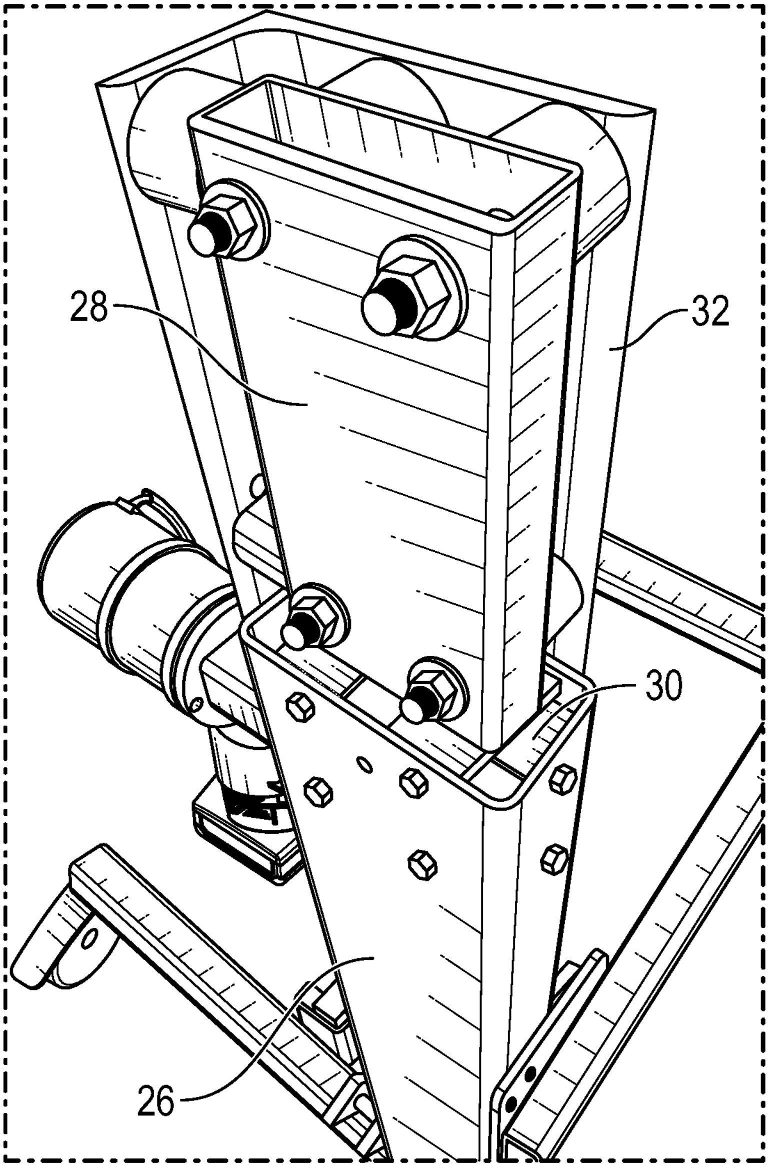
FIG. 9 shows a close-up view of the vertical riser assembly showing the inner tube member in a lowered position with respect to the outer housing.
Figure 10:
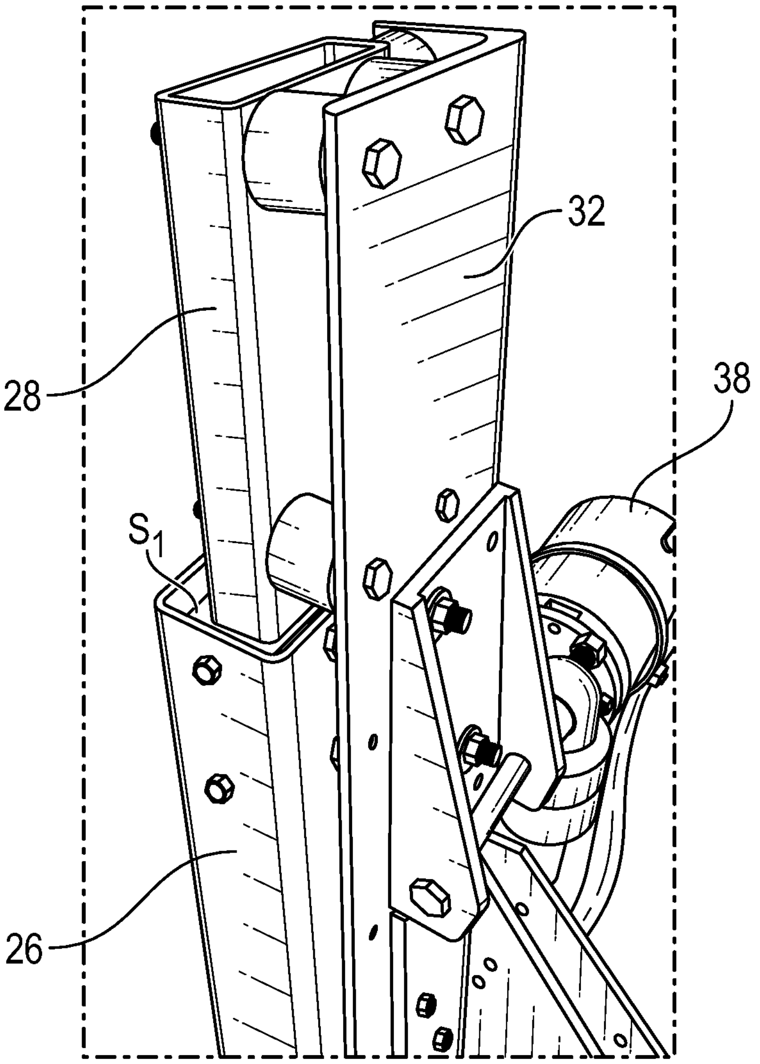
FIG. 10 shows a close-up view of the opposite side of the vertical riser assembly depicted in FIG. 9.

Referring now to the figures, FIGS. 1-5 show an embodiment of a height adjustable anterior walker 10 supporting a user, U. FIG. 1 shows the basic components of an embodiment of the height adjustable anterior walker 10 which comprise a ground support frame 12, a vertical riser assembly 14, a torso support assembly 16, and an actuator apparatus 18, wherein the vertical riser assembly and actuator apparatus are located offset from the front center of the walker 10.

The ground support frame 12 has a front 20, a rear 22, and a plurality of ground engaging wheels 24. Ground engaging wheels 24 may be pivoting to facilitate steering of the apparatus and may have braking assemblies to prevent undesired rolling of the apparatus.

The ground support frame 12 may further comprise first side rail member 23 and a second side rail member 25. A front vertical member 27 may be attached to the front of the second side rail member 25. The front 20 of ground support frame 12 may comprise a rail member which extends from the vertical riser assembly 14 to the front vertical member 27.

The vertical riser assembly 14 comprises an outer housing 26 and an inner tube member 28 which is slidingly contained within the outer housing. A plurality of bearing members 30 are disposed between an outwardly facing surface S1 of the inner tube member 28 and an inwardly facing surface S2 of the outer housing 26. As shown in the figures, the bearing members 30 may be attached to the outer housing. In addition, although not depicted in the figures, similar bearing members may also be attached to the outside surface of the inner tube member 28, such that the bearing members travel with the inner tube member as it reciprocates within the outer housing 26.

The torso support assembly 16 is attached to a rising portion of the vertical riser assembly 14. In most embodiments, including those embodiments depicted in the figures, the inner tube member 28 is the portion of the vertical riser assembly which rises while the outer housing 26 remains stationary. However, those skilled in the art of the invention will understand that an embodiment may be configured in which the inner tube member remains stationary while the outer housing moves with respect to the inner tube member.

The actuator apparatus 18 has a base member 34 attached to the ground support frame 12. Actuator apparatus 18 may also have an extension member 36 which extends between the base member 34 and the vertical riser assembly 14 or structure attached to the vertical riser assembly. The actuator apparatus 18 comprises a prime mover, such as an electric motor 38, which is configured to actuate the extension member 36 and thereby move the torso support assembly 16 between a lowered first position to a raised second position, and a plurality of positions there between, thereby allowing a user to place the torso support assembly at a desired height. The electric motor 38 depicted in the figures may be powered by a rechargeable battery 40. Actuator apparatus 18 may be controlled with selector lever 42 which may be located at any desired location on the walker 10.

Figure 11:
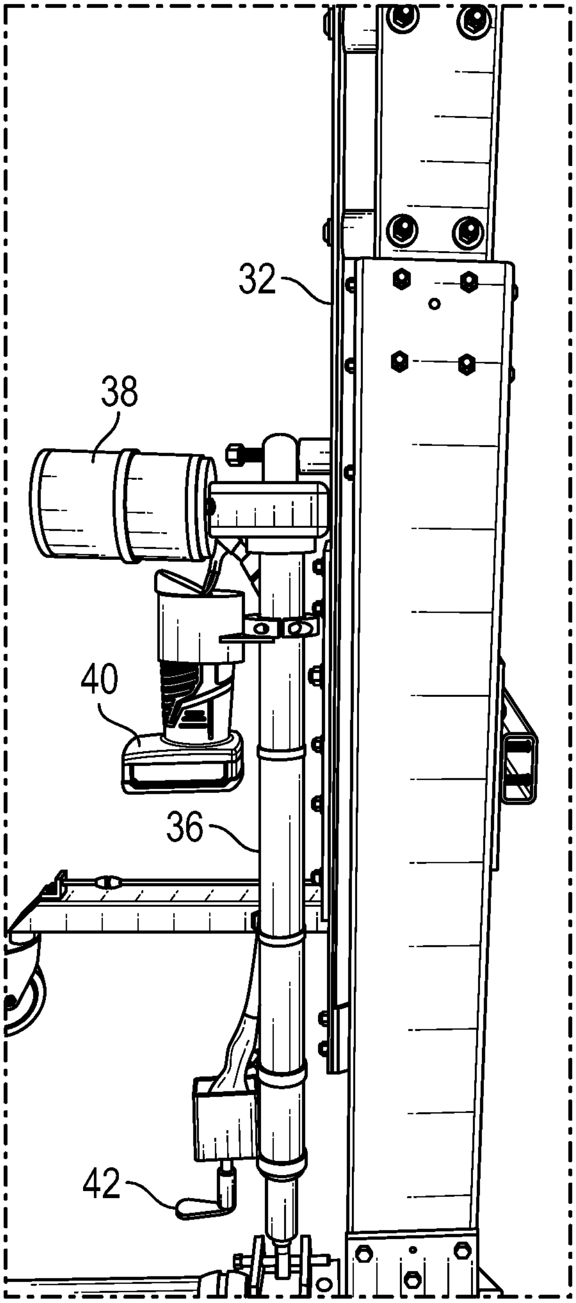
FIG. 11 shows a side view of the vertical riser assembly with the actuator apparatus in a different disposition.
Figure 12:
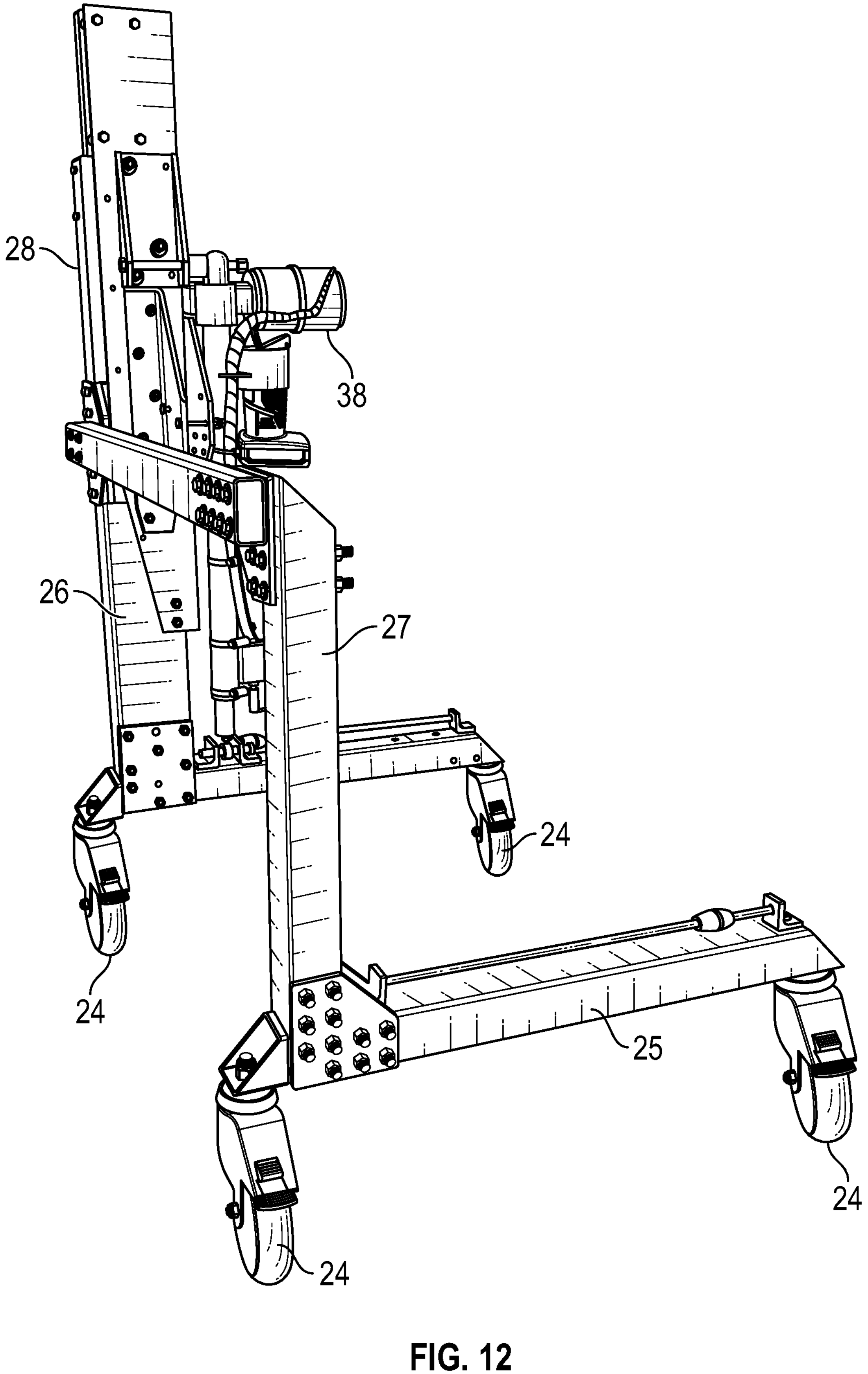
FIG. 12 shows an embodiment of the present invention with the torso support assembly removed from the ground support frame and vertical riser assembly.

Those skilled in the art of the invention will appreciate that a variety of different actuator devices may be utilized for raising and lowering the torso support assembly 16. While the embodiments depicted in the figures utilize a ball screw as the actuator apparatus, the actuator device may also utilize a piston-cylinder combination, chain drive, scissor-lift, and the like for raising and lowering the torso support assembly. It is also to be appreciated that the actuator device may be installed in alternative positions. For example, as depicted in FIG. 11, the actuator apparatus 18 may be installed in an inverted position. In such a position, with the entire assembly inverted, the electric motor 38 may be adjacent to the attachment point of the extension member 36 to as opposed to adjacent to the ground support frame 12 as depicted in the figures.

The prime mover-actuator apparatus combination is configured to stop and maintain the torso support assembly at a plurality of intermediate positions between the lowered first position and the raised second position. Embodiments of the invention may alternatively be configured to utilize other types of prime movers, such as hydraulic motors, compressed gas cylinders, or the like. The torso support assembly 16 may be attached to a structural attachment member which, in turn, is attached to the vertical riser assembly 14. For example, the torso support assembly 16 may be attached to a floating mount plate 32 which may be mounted in a vertical disposition to the vertical riser assembly 14. Floating mount plate 32 may be configured from a piece of angle material which is cut, shaped and drilled to a configuration as shown in the figures. Floating mount plate 32 may be configured from aluminum angle or some structurally strong composite material.

A yoke member 44 may be utilized in conjunction with lateral support bar 46 to attach the torso support assembly 16 to vertical riser assembly 14.

Figure 13:
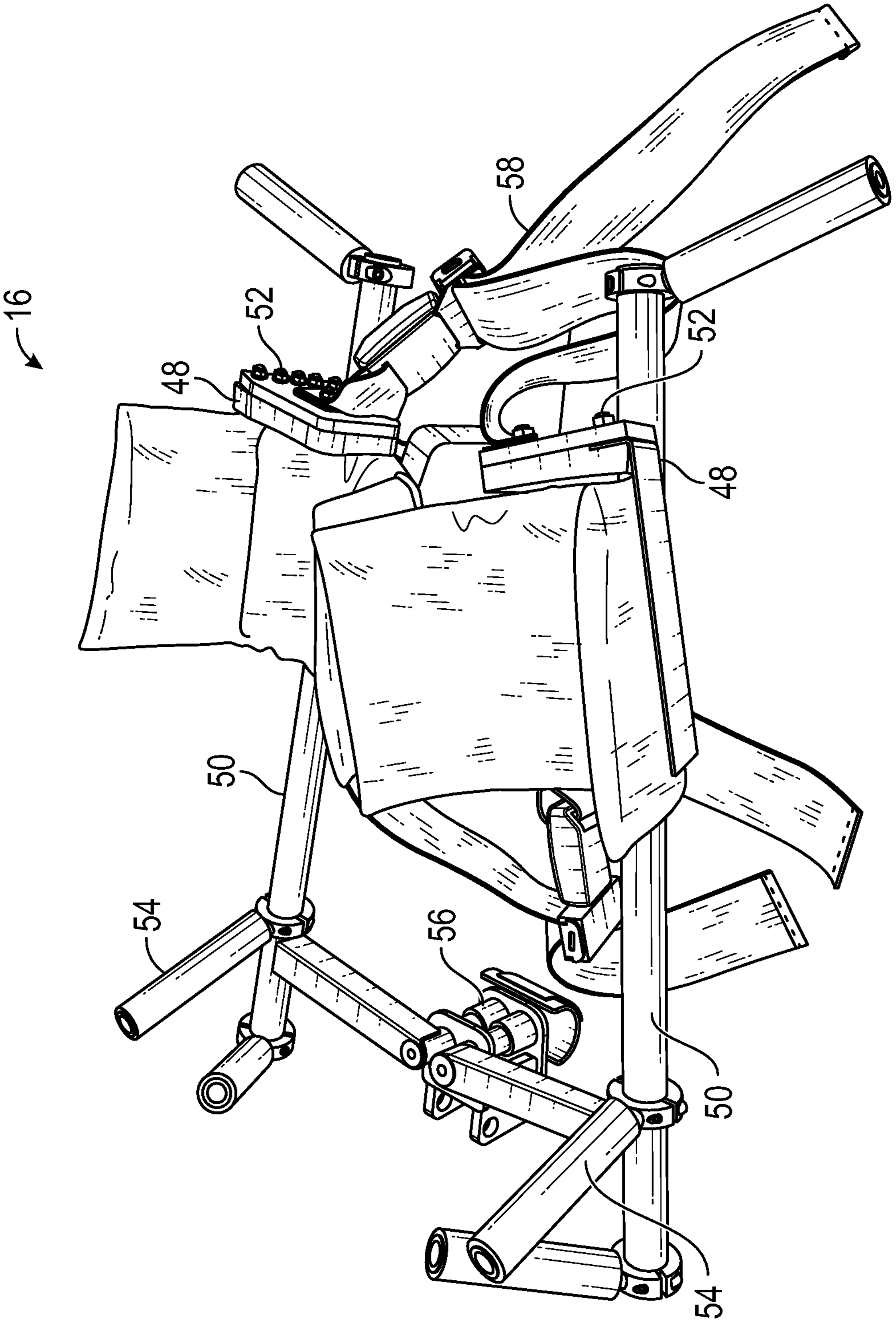
FIG. 13 shows an embodiment of the torso support assembly removed from the device.

An embodiment of torso support assembly 16 separated from the other components of the apparatus is depicted in FIG. 13. The torso support assembly 16 is configured to provide comfortable support to a user U by providing cushioned arm support trays 48, which are each attached to arm support members 50. The arm support trays 48 are configured to allow the user to place each arm in an arm support tray, with the user's elbows abutting a rear stop 52. With this configuration, the torso support assembly may be raised to a position in which the user's arms may be placed such that the user's forearms are in a near horizontal position when placed in the arm support trays 48 to support the user's weight. So positioned, the torso support assembly provides substantial, stable and comfortable support to the user. Torso support assembly 16 may further comprise hand grips 54 which may be grabbed by the user for comfort and support.

Each of the arm support members 50 may pivot about a gearbox 56, wherein each of the arm support members has a gear member which meshes with a gear member of the other arm support member. Gearbox 56 is configured such that the arm support members 50 pivot inwardly together and outwardly together, thereby allowing a user to position both arm support members by movement of a single arm support member.

The torso support assembly may further comprise a safety strap 58 which may secure around the user's waist. The torso support assembly may further comprise a left thigh support member 60 and a right thigh support member 60. When used, the thigh support members 60 allow a user with inadequate arm/upper body strength to stand upright by transferring weight to the surface area of the thighs. Thigh support members 60 may utilize hook and loop fasteners to facilitate the attachment of the supports to a user's legs.

The torso support assembly may further comprise front handle members 62 and rear handle members 64 which may be utilized by an assistant, caregiver, or therapist to guide or assist a user.

Embodiments of the disclosed apparatus may be configured from materials which are relatively light, with some components fabricated from composite materials, such as carbon fiber. Embodiments of the apparatus may be configured to be disassembled with removable pins and spring-loaded detents to a facilitate storage and transport of the device. Some embodiments of the device may include hinged or foldable components to facilitate storage and transport.

Having thus described the preferred embodiment of the invention, what is claimed as new and desired to be protected by Letters Patent includes the following:

1. An anterior walker comprising:

a ground support frame comprising a front, a rear, and a plurality of ground engaging wheels;

a vertical riser assembly attached to the ground support frame, the vertical riser assembly at a position offset from the front of the ground support frame, the vertical riser assembly comprising an outer housing, an inner tube member slidingly contained within the outer housing, wherein a plurality of bearing members are disposed between an outwardly facing surface of the inner tube member and an inwardly facing surface of the outer housing;

a torso support assembly attached to a portion of the vertical riser assembly, the torso support assembly configured to support a user wherein the torso support assembly comprises a first arm support member and a second arm support member wherein the first arm support member comprises a first arm support tray and a first hand support member and the second arm support member comprises a second arm support tray and a second hand support member, wherein the first arm support member and the second arm support member are configured such that the torso support assembly may be raised to a height where the user is supported by having a first arm disposed in the first arm support tray and by having a second arm disposed in the second arm support tray wherein the first arm support member is disposed on a first bar and the second arm support member is disposed on a second bar, wherein the first bar and the second bar are pivotally attached to a gear box and configured such that an inwardly pivoting of the first arm support member causes an inwardly pivoting of the second arm support member and an outwardly pivoting of the second arm support member causes an outwardly pivoting of the first arm support member; and an actuator apparatus comprising an extension member which extends between the ground support frame and the vertical riser assembly, the actuator apparatus further comprising a prime mover configured to actuate the extension member and thereby move the torso support assembly between a lowered first position, a raised second position, and a plurality of intermediate positions there between.

2. The anterior walker of claim 1 further wherein the torso support member comprises a first thigh support strap and a second thigh support strap.

3. The anterior walker of claim 1 wherein the ground support frame comprises a first side rail member and a second side rail member in parallel disposition with the first side rail member and the plurality of ground engaging wheels comprises a first front wheel attached at the front of the first side rail member, a first rear wheel attached at the rear of the first side rail member, a second front wheel attached at the front of the second side rail member, and a second rear wheel attached at the rear of the second side rail member.

4. The anterior walker of claim 3 wherein the vertical riser assembly is attached to the front of the first side rail member.

5. The anterior walker of claim 4 wherein a front vertical member is attached to the front of the second side rail member.

6. The anterior walker of claim 5 wherein a front rail member extends between the vertical riser assembly and the front vertical member.

7. An anterior walker comprising:

a ground support frame comprising a plurality of ground engaging wheels;

a single vertical riser assembly attached to a side of the ground support frame, the single vertical riser assembly comprising an outer housing and an inner tube member slidingly contained within the outer housing;

a floating mount plate attached to the single vertical riser assembly;

a torso support assembly attached to the floating mount plate, the torso support assembly comprising a pivotally attached first arm support member and a pivotally attached second arm support member; and an actuator apparatus comprising a base member attached to the ground support frame, the actuator apparatus further comprising an extension member having a first end attached to the base member and a second end attached to the floating mount plate, the actuator apparatus further comprising a prime mover configured to actuate the extension member and thereby move the torso support assembly between a lowered first position, a raised second position, and a plurality of intermediate positions there between.

8. The anterior walker of claim 7 wherein the first arm support member comprises a first arm support tray and the second arm support member comprises a second arm support tray, wherein the first arm support member and the second arm support member are configured such that the torso support assembly may be raised to a height where the user is supported by having a first arm disposed in the first arm support tray and having a second arm disposed in the second arm support tray.

9. The anterior walker of claim 7 wherein the torso support assembly comprises a a left thigh support and a right thigh support.

10. The anterior walker of claim 7 wherein the ground support frame comprises a first side rail member and a second side rail member in parallel disposition with the first side rail member and the plurality of ground engaging wheels comprises a first front wheel attached at the front of the first side rail member, a first rear wheel attached at the rear of the first side rail member, a second front wheel attached at the front of the second side rail member, and a second rear wheel attached at the rear of the second side rail member.

11. The anterior walker of claim 10 wherein the single vertical riser assembly is attached offset from the front of the first side rail member.

12. The anterior walker of claim 11 wherein a front vertical member is attached to the front of the second side rail member.

13. The anterior walker of claim 12 wherein a front rail member extends between the single vertical riser assembly and the front vertical member.

14. An anterior walker comprising:

a ground support frame comprising a first side rail member and a second side rail member in parallel disposition with the first side rail member, the first side rail member comprising a first front ground engaging wheel and a first rear ground engaging wheel, and the second side rail member comprising a second front ground engaging wheel and a second rear ground engaging wheel;

a vertical riser assembly attached to the front of the first side rail member, the vertical riser assembly comprising an inner tube member slidingly contained within an outer housing, wherein a plurality of bearing members are disposed between an outwardly facing surface of the inner tube member and an inwardly facing surface of the outer housing;

a floating mount plate attached to the vertical riser assembly;

a front vertical member attached to a front of the second side rail member, and a front rail member extending from the vertical riser assembly to the front vertical member;

a torso support assembly attached to the floating mount plate, the torso support assembly comprising a first arm support member and a second arm support member wherein the first arm support member is disposed on a first bar and the second arm support member is disposed on a second bar, wherein the first bar and the second bar are pivotally attached to a gear box and configured such that the first bar and the first arm support member and the second bar and the second arm support member pivot together; and an actuator apparatus comprising a base member attached to the first side rail member, an extension member having a first end attached to the base member and a second end attached to the floating mount plate, the actuator apparatus further comprising a prime mover configured to actuate the extension member and thereby move the torso support assembly between a lowered first position and a raised second position.

15. The anterior walker of claim 14 wherein the first arm support member comprises a first arm support tray and the second arm support member comprises a second arm support tray, wherein the first arm support member and the second arm support member are configured such that the torso support assembly may be raised to a height where the user is supported by having a first arm disposed in the first arm support tray and having a second arm disposed in the second arm support tray.

16. The anterior walker of claim 14 wherein a front end of the anterior walker is defined by the front rail member, the anterior walker having no structure extending forward of the front rail member.

* * * * *